April 27, 1954  W. R. KOHSE  2,676,856
MOVABLE ANTIFRICTION BEARING FOR HOISTING DRUMS
Filed Aug. 27, 1952  3 Sheets-Sheet 3

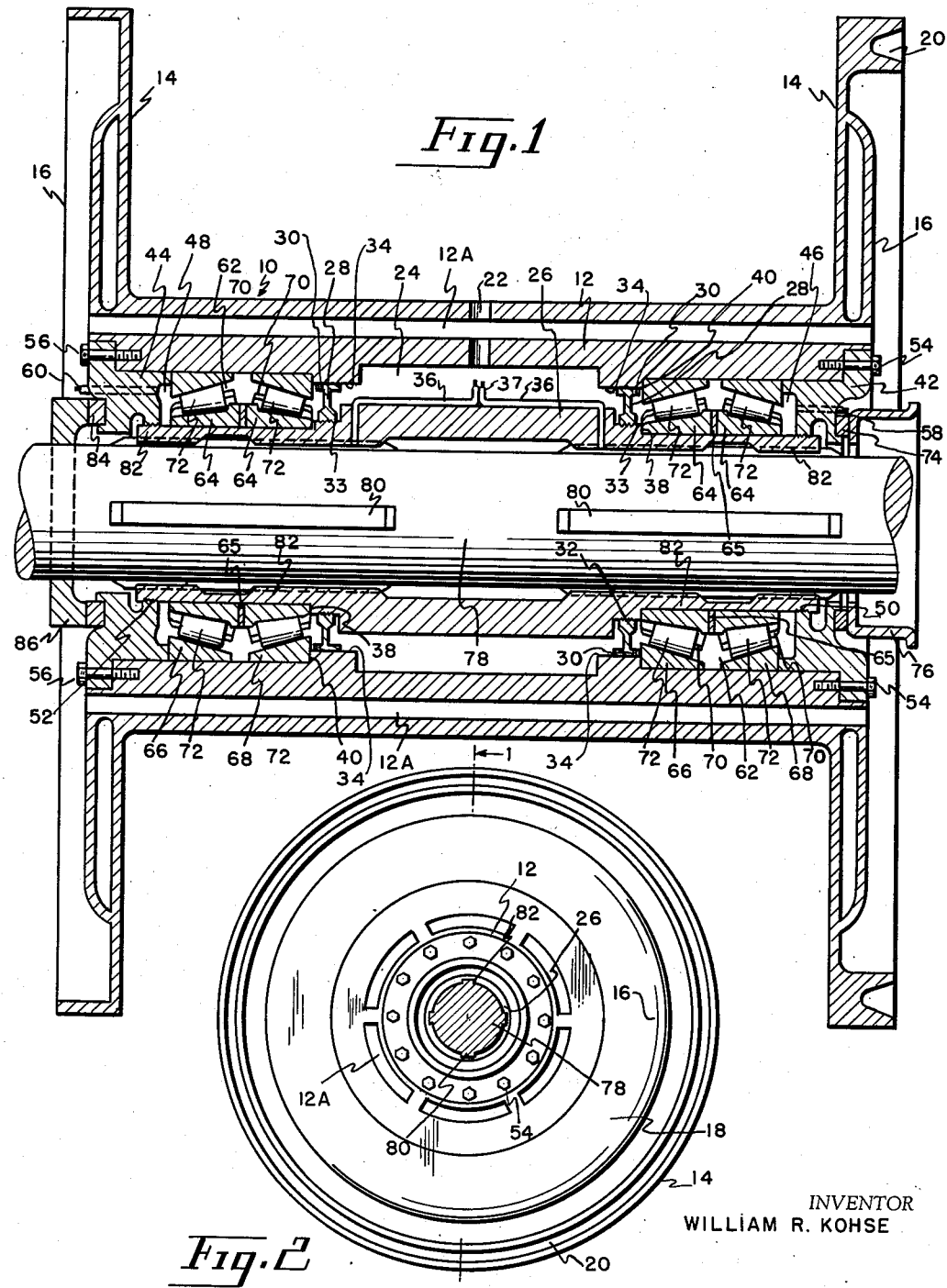

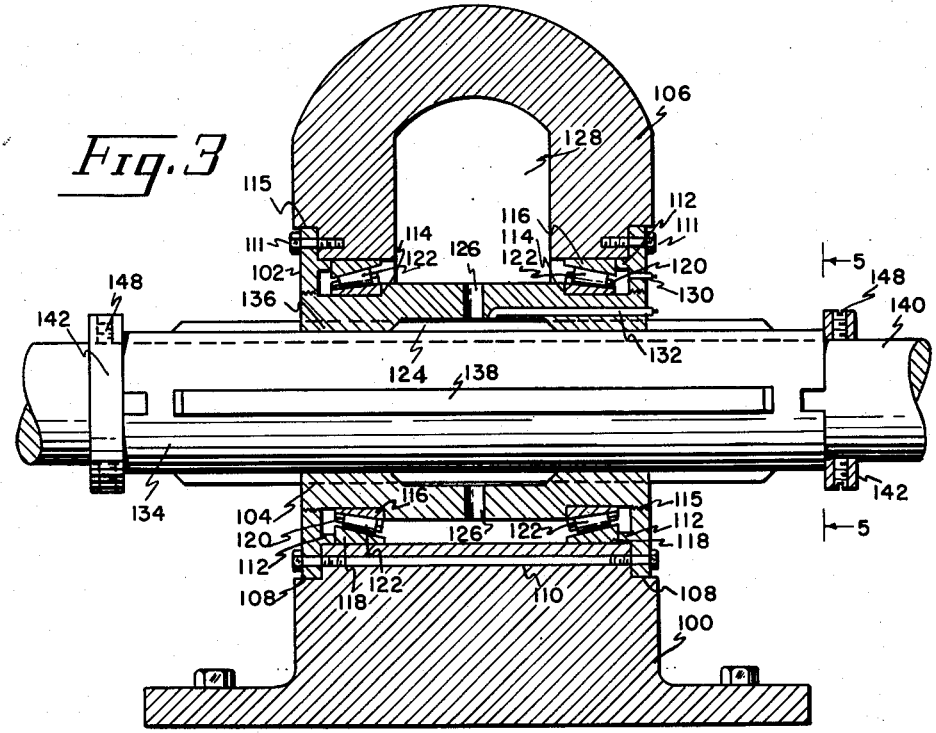
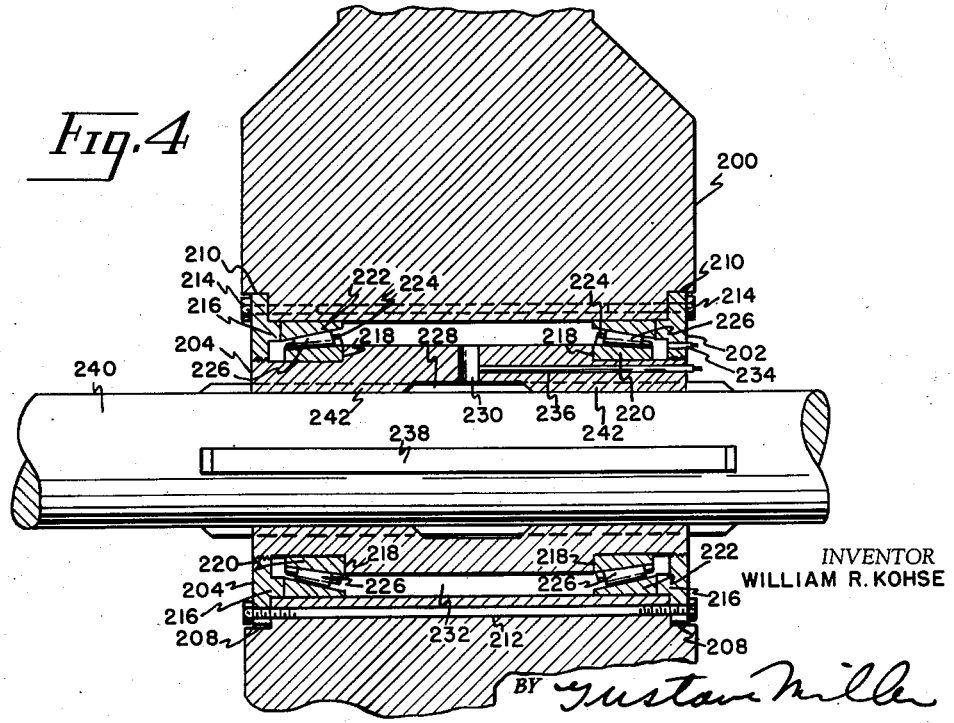

INVENTOR
WILLIAM R. KOHSE
BY Gustave Miller
ATTORNEY

Patented Apr. 27, 1954

2,676,856

UNITED STATES PATENT OFFICE 2,676,856

MOVABLE ANTIFRICTION BEARING FOR HOISTING DRUMS

William R. Kohse, Rochester, Wash.

Application August 27, 1952, Serial No. 306,572

9 Claims. (Cl. 308—187)

This invention relates to movable anti-friction bearing means and it particularly relates to sealed lubricated roller bearings for drums, gears or the like.

Bearing means which are used for the heaviest types of work such as for heavy gearing, logging hoist drums or the like are usually necessarily in the form of solid bushings. These solid bushings, however, quickly wear down and the concentricity which is an essential characteristic of a bearing is lost. It is then necessary to tear down the whole machine in order to install a new bushing. As a result, the machine may be laid up for hours or even days at a time, and usually this happens when the machine is most needed.

It is, therefore, one object of this invention to provide a roller bearing means which is strong enough to take the stress of the heaviest loads, and is also movable when running under slow or high speeds or standing still.

Another object of this invention is to provide a heavy duty roller bearing means wherein the parts are completely enclosed to prevent leakage of oil or grease and entrance of dirt, dust or grit into the bearing.

Another object of this invention is to provide a heavy duty roller bearing means which, although of strong and heavy construction, is nevertheless compact in nature and comprised of relatively few parts.

A further object of this invention is to make it possible to use long wearing roller bearings in heavy duty logging hoist drums, gears and the like which are of the nature that provision must be made not only for rotation of the hub on its shaft, but also for transverse shifting of the hub on its shaft in cooperation with conventional clutching mechanism. In the conventional mechanism, the hub is journaled on a solid bushing on its shaft, which wears rapidly, while in this invention, the hub is journaled by lubricated roller bearings on a hollow axle or sleeve, which axle or sleeve in turn is cooperatively splined on the shaft, is well lubricated, and has means for replenishing the lubrication both on the shaft and on the roller bearings, thus practically eliminating wear.

Other objects of this invention are to provide an improved device of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a sectional view of the roller bearing means mounted in the hub of the drum.

Fig. 2 is an end view of the device shown in Fig. 1.

Fig. 3 is a sectional view showing the splines mounted on a sleeve which is separable from the shaft.

Fig. 4 is a sectional view showing the invention applied to a gear which is adapted to slide on the shaft while the shaft is rotating at either slow or high speed.

Figure 5:
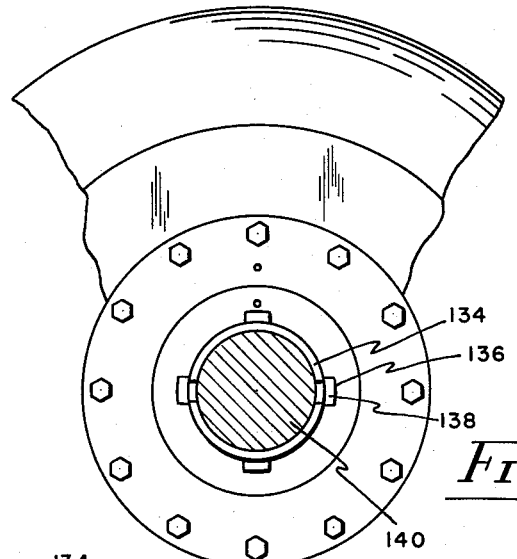
Fig. 5 is an end view taken on line 5—5 of Fig. 3.

Referring now in greater detail to the drawings wherein similar reference characters refer to similar parts, there is shown in Fig. 1 a drum 10 comprising a hub 12 having a plurality of annular openings 12A therethrough and flanges 14 integral with the hub. Radial spokes are positioned between the bores 12A. The flanges 14 are provided with embossed portions 16. A peripheral channel 20 is provided in the right flange as viewed in Fig. 1.

The above described annular bore and spoke arrangement is for the purpose of allowing cooling air to enter the hub and dissipate the heat generated therein. A port 22 is centrally located in the hub 12 and this port communicates with an annular cooling chamber 24. This chamber 24 is formed by the combination of a hollow axle or sleeve 26 and a pair of rings 28 which are provided with set screws 30. The rings 28 are held against the internal annular flanges 34 of the hub by these set screws. These rings 28 provide a sealing means to prevent lateral escape of the lubricant from the roller bearings. A pair of grease tubes 36 having fitting 37 accessible through port 22 lead from the cooling chamber 24 through the sleeve axle 26 to the interior of the axle where a shaft 78 is adapted to be positioned. A shoulder 38 is formed adjacent the shoulder 33 of the axle and a shoulder 40 is provided adjacent the internal flange 34. These shoulders combine with closure ring 42 on one side and with closure ring 44 on the other side to form a pair of annular recesses or chambers 46 and 48.

There are grease seals 50 and 52 provided between the closure rings 42 and 44 respectively and the axle 26. An annular series of bolts 54 connect the ring 42 to the hub 12 and annular series of bolts 56 connect the ring 44 to the hub 12 adjusting shims being provided as needed between the rings 42 and 44 and the hub. A lubricant inlet tube 58 extends through the ring 42 into the annular recess 46 and a tube 60 of similar nature extends through ring 44 into annular recess 48. In each of these annular recesses are provided roller bearing means 62.

Each of the roller bearing means comprises a pair of inner rings 64 spaced from each other by a spacer ring 65, and an outer ring concentric with the inner rings, the outer ring being formed of spaced wedge-shaped rings 66 and 68. The inner rings 64 are provided with oppositely disposed cages 70 corresponding to wedge rings 66 and 68. Held between the inner rings 64 and the outer wedge rings 66 and 68 bearing laterally against the cages 70 are a plurality of tapered rollers 72. Particularly in heavy duty drums, one set of bearings, preferably, although not necessarily the inner set, may be made with a slightly different angle as shown than the other set of bearings, to cause them to increase their anti-thrust bearing effect. Obviously, this angle may be made as great as desired according to the anti-thrust effect desired.

While each roller bearing has been shown as including a pair of inner rings, a pair of outer rings, and a series of tapered rollers between each inner and outer ring of each pair, it is obvious that each roller bearing could consist of only a single inner and outer ring and a single series of tapered rollers therebetween at a suitable angle to also act as anti-thrust bearings, depending on the load to be carried.

A washer 74 made of bronze or the like is held between the closure ring 42 and a cage member 76. The cage member surrounds the shaft 78 outwardly of the hub. The purpose of this cage member is to support one end of a spring, not shown, which biases the shaft and its supported drum to a predetermined position. The shaft 78 extends through the axle 26 and is held from rotation relative to the axle by a plurality of splines 80 which are adapted to be held within channels 82 formed in the axle. A washer 84 similar to washer 74 is held between closure ring 44 and an outer ring 86 through which shaft 78 extends.

In operation, the cage member 76 cooperates with the clutching mechanism, not shown, wherein the hub 12 is shifted longitudinally of the axis of the shaft 78 between clutch and declutched positions. With the conventional type of hub and shaft, bronze bearings or bushings are provided between the hub and the shaft to permit the necessary rotation and shifting, and these soon wear out of round, making rebushing necessary. With this invention, the rotation takes place between the hub 12 and the axle 26 on the well lubricated roller bearings 72, while lateral shifting takes place between the axle 26 and the shaft 78 on the well lubricated splines 80 and axle channels 82. As a result, friction and wear are substantially eliminated, and it is possible as a result of this invention to provide and use long wearing roller bearings for heavy duty logging hoist drums and the like which have to both rotate and shift laterally, in place of the conventional bushings.

Figure 6:
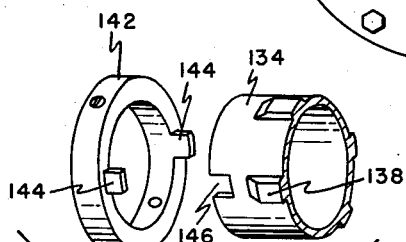
Fig. 6 is an exploded view showing the collar disconnected from the shaft sleeve.

In Figs. 3, 5 and 6 there is shown a modification of the invention wherein the shaft is mounted in a movable pillow-block. The pillow-block comprises a base 100, a pair of closure rings 102, a bearing sleeve 104 and a hollow dome 106. The closure rings 102 at each edge of the bearing are held on annular shoulders 108 of the base 100 by means of bolts 110. Bolts 111 connect the closure rings to the dome. The closure rings 102 are each provided with a flange 112 which is adapted to underlie the edge portion of the dome 106. A grooved grease seal is provided in the closure rings 102 as at 115.

Annular shoulders 114 are formed on the sleeve 104 and positioned between these shoulders and the flanges 112 are annular roller bearing assemblies comprising inner wedge-shaped rings 116 and outer-wedge-shaped rings 118. Off-set flanges 120 are formed on the inner rings 116 and between the inner and outer rings 116 and 118 and bearing against the flanges 120 are provided a plurality of tapered rollers 122. An annular recess 124 is centrally located in the interior of the sleeve 104 and a series of ports 126 in the sleeve form a fluid connection between this recess 124 and the annular chamber 128. A lubricant supply tube 130 extends through spacer 102 and into the area surrounding the roller bearings. Another lubricant supply tube extends through sleeve 104 into annular recess 124.

A sleeve 134 extends through the bearing sleeve 104 and this sleeve 134 is provided with a plurality of splines 138 which fit into channels 136 formed in the sleeve 104. A shaft 140 extends through the sleeve 134 and is connected to it by collars 142 having lugs 144 which are adapted to fit into slots 146 formed in the sleeve 134. The collars 142 are held on the shaft 140 by Allen screws 148. Lubrication for the sleeve 134 is provided through tube 132 and recess 124.

By using the construction illustrated in Figs. 3, 5 and 6, the shaft is axially adjustable within the pillow-block since the splines 138 on the sleeve 134 can remain fixed within channels 136 even though the shaft is moved axially.

Figure 7:
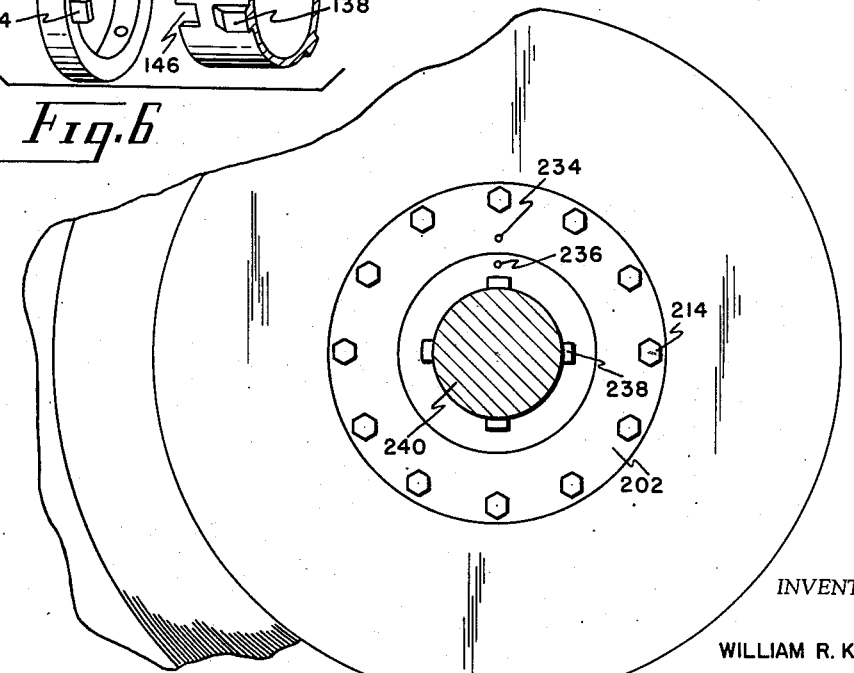
Fig. 7 is an end view of the invention shown in Fig. 4.

A third modification is shown in Figs. 4 and 7 and shows the invention applied to a shiftable gear. The gear 200 is provided with a bore in which are positioned annular closure rings 202 at either edge of the gear and a sleeve 204. The closure rings 202 rest on shoulders 208 and 210 which are formed in the bore of the gear 200. Alternately arranged elongated bolts, such as shown at 212, 214, connect the closure ring to the gear. Flanges 216 are formed on each of the closure rings 202.

Annular shoulders 218 are formed on the sleeve 204 and positioned between these shoulders and the flanges 216 are annular roller bearing assemblies comprising inner wedge-shaped rings 220 and outer wedge-shaped rings 222. Roller cages 224 are provided on the inner races 220. Between the inner race 220 and outer race 222 and bearing against the flanges 224 are a plurality of tapered rollers 226. An annular recess 228 is provided in the central portion of the sleeve 204 and ports such as shown at 230 connect the recess 228 to annular chamber 232. A lubricant inlet tube 234 is provided in each closure ring 202 and a lubricant inlet tube 236 is provided in sleeve 204. The tube 236 enters into one of the ports 230. In this modification splines 238 are provided directly on the shaft 240. The splines 238 fit into channels 242 in the sleeve.

Although this invention has been described in considerable detail, such description is intended as being illustrative rather than limiting, since the invention may be variously embodied, and the scope of the invention is to be determined as claimed.

What is claimed as the invention is:

1. In combination, a rotatable shaft and a journal for said shaft comprising a housing through which said shaft extends, a sleeve in said housing surrounding said shaft, splines connected to said shaft and adapted to be held within channels formed in said sleeve, a pair of roller bearing means within said housing, one of said roller bearing means being positioned adjacent each end of said housing and surrounding said sleeve, each of said roller bearing means comprising a pair of concentric rings having tapered complementary faces and a plurality of tapered rollers positioned between said complementary faces, and a closure ring at each end of said housing outwardly of said roller bearing means, at least one of said closure rings being provided with a lubricant inlet into the space surrounding said roller bearing means.

2. The combination of claim 1 wherein said housing forms the hub of a drum, said drum being formed by annular flanges on each end of said hub.

3. The combination of claim 2 wherein a sealing ring is positioned on the side of each roller bearing which is opposite to said closure rings, said sealing rings being adapted in conjunction with said closure rings, to form a sealed lubricant chamber for each of said roller bearings.

4. In combination, a rotatable shaft and a journal for said shaft comprising a housing through which said shaft extends, a sleeve in said housing surrounding said shaft, splines connected to said shaft and adapted to be held within channels formed in said sleeve, a pair of roller bearing means within said housing, one of said roller bearing means being positioned adjacent each end of said housing and surrounding said sleeve, each of said roller bearing means comprising a pair of concentric rings having tapered complementary faces and a plurality of tapered rollers positioned between said complementary faces, said housing being in the form of a gear and said splines being formed directly on said shaft.

5. Roller bearing means for a heavy duty rotary member which is both rotative and laterally shiftable on its shaft, said means comprising a hollow axle interposed between said rotary member and its shaft, roller bearings interposed between said hollow axle and said rotary member, means for feeding lubricant to said roller bearings, means for sealing the lubricant about said roller bearings, cooperating spline and channel means within said hollow axle and about said shaft permitting lateral shifting of said axle to said shaft but preventing relative rotation therebetween, means for feeding lubricant to said spline and channel means between said axle and shaft and means for sealing lubricant between said axle and shaft.

6. Roller bearing means as set forth in claim 5 wherein the roller bearings each comprise at least a single pair of complementary bearing rings and a single series of tapered rollers therebetween adjacent each end thereof.

7. Roller bearing means as set forth in claim 6 wherein there is also a second pair of complementary rings and a second series of tapered rollers adjacent the first pair of bearings, the rollers and rings of said second pair tapering oppositely to said first pair and are of a steeper angle type than the first pair.

8. Roller bearing means as set forth in claim 7 wherein there is a sealed lubricant chamber between said rotary member and said shaft within which said bearings are located.

9. Roller bearing means as set forth in claim 8, and means for feeding lubricant to said sealed chamber.

References Cited in the file of this patent
UNITED STATES PATENTS

| Number | Name | Date |
| --- | --- | --- |
| 1,018,697 | Davis | Feb. 27, 1912 |
| 2,170,498 | Hektner | Aug. 22, 1939 |
| 2,262,512 | Musselman | Nov. 11, 1941 |
| 2,459,290 | Rozner | Jan. 18, 1949 |